350-96.26
5/15/79   OR   4,154,502   SR

United States Patent [19]
Siegmund

[11] 4,154,502
[45] May 15, 1979

[54] DYNAMIC IMAGE ENHANCER FOR FIBERSCOPES

[75] Inventor: Walter P. Siegmund, Woodstock, Conn.

[73] Assignee: American Optical Corporation, Southbridge, Mass.

[21] Appl. No.: 874,073

[22] Filed: Feb. 1, 1978

[51] Int. Cl.² .................................................. G02B 5/17
[52] U.S. Cl. ................................. 350/96.26; 350/6.2; 350/96.25
[58] Field of Search ............... 350/6.2, 96.24, 96.25, 350/96.26, 96.27

[56] References Cited

U.S. PATENT DOCUMENTS

| | | | |
|---|---|---|---|
| 2,939,362 | 6/1960 | Cole | 352/105 |
| 3,016,785 | 1/1962 | Kapany | 350/96.25 |
| 3,110,762 | 11/1963 | Frank | 350/96.25 X |
| 3,166,395 | 1/1965 | Hicks, Jr. | 65/4 B X |
| 3,217,588 | 11/1965 | Chitayat | 350/96.25 |
| 3,217,589 | 11/1965 | Chitayat | 350/96.25 |
| 3,554,632 | 1/1971 | Chitayat | 350/96.25 |
| 3,740,115 | 6/1973 | Cole | 350/96.26 |
| 3,913,568 | 10/1975 | Carpenter | 128/11 |

*Primary Examiner*—John R. Corbin
*Assistant Examiner*—John D. Lee
*Attorney, Agent, or Firm*—Jeremiah J. Duggan; Howard R. Berkenstock, Jr.; Alan H. Spencer

[57] ABSTRACT

A short fiber optic image transmitter receives an image produced by a fiberscope objective and transmits the image to the image receiving end of the flexible fiber optic bundle of the fiberscope. The short image transmitter is oscillated about an axis normal to its direction of image transmission for causing images transmitted thereby to scan across the image receiving end of the fiberscope bundle. Synchronous scanning of the opposite image emitting end of the fiberscope bundle renders the received images stationary and of enhanced resolution.

3 Claims, 7 Drawing Figures

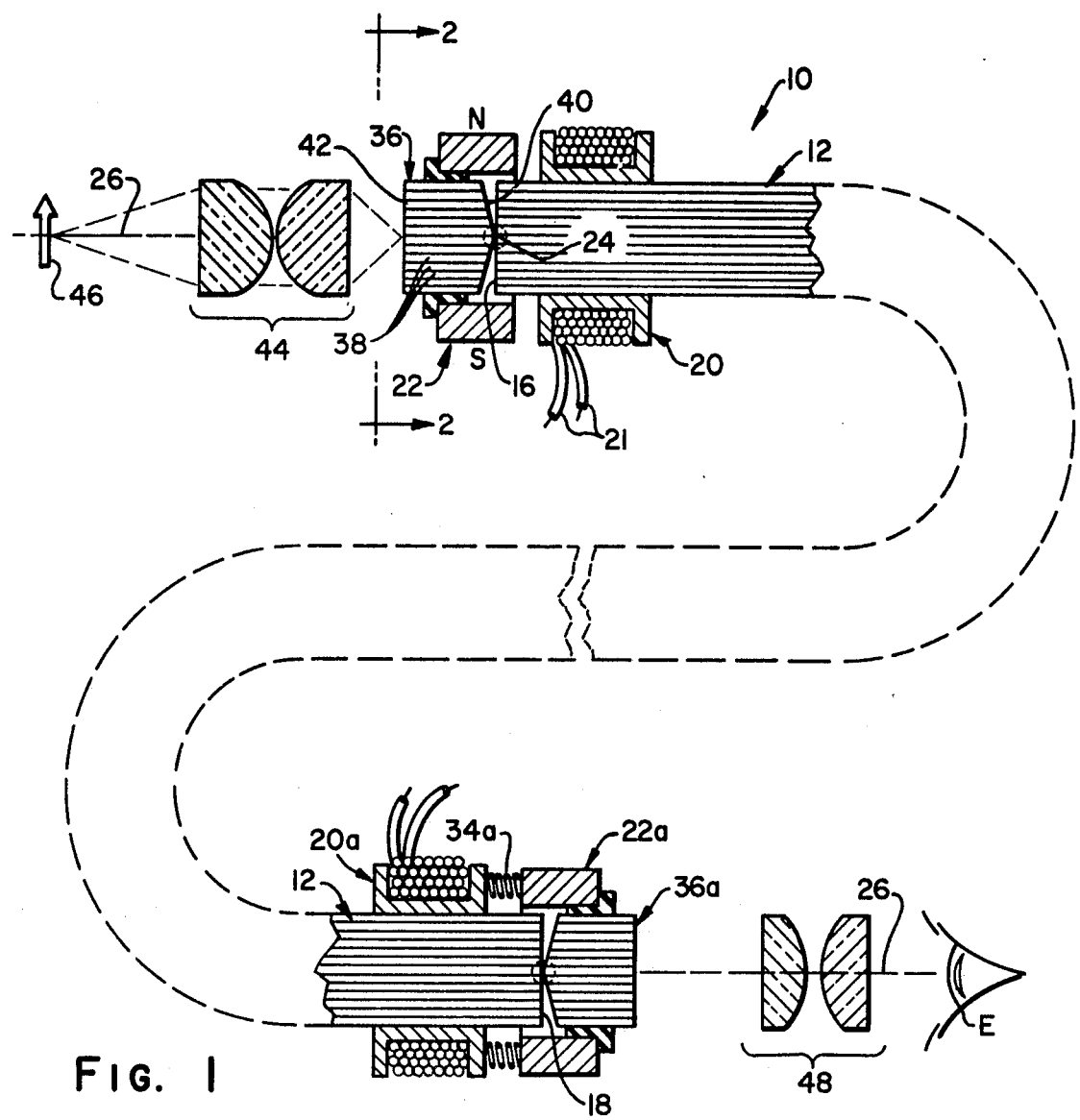
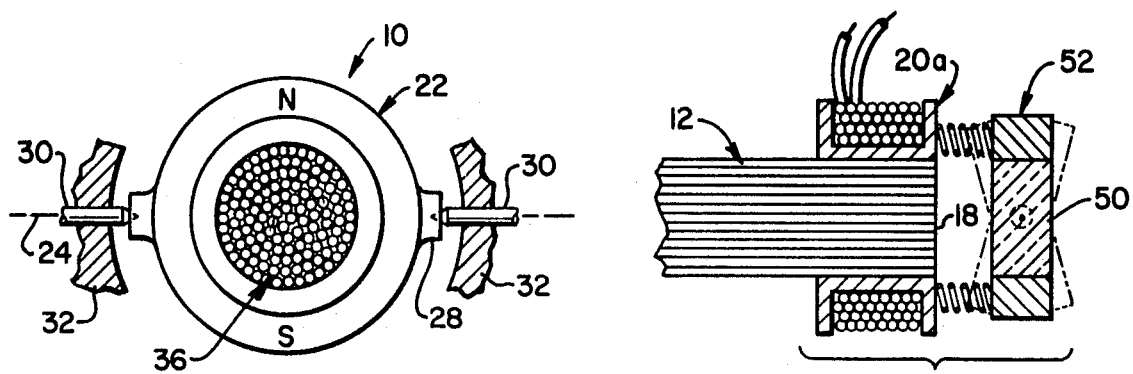
FIG. 1
FIG. 2
FIG. 3

DYNAMIC IMAGE ENHANCER FOR FIBERSCOPES

BACKGROUND OF THE INVENTION

1. Field of the Invention

This invention relates to fiber optic image transmitting devices and more particularly to means for enhancing the resolution of optical images transmitted thereby.

2. Description of the Prior Art

Bundles of optical fibers having their corresponding opposite ends arranged in identical geometrical patterns afford image transmitters which conduct image forming light by the well known principles of total internal reflection. The packing tightness and particular mosaic patterning of the fiber ends, their respective diameters and cladding thicknesses as well as absence or existence of broken or otherwise damaged fiber cores individually and collectively affect the image resolving power of the bundles whether they are of the rigid or intermediately flexible (fiberscope) type.

In view of the fact that spacing between light-conducting cores resulting from fiber claddings, defects of fiber breakage and/or blemishing and foreign matter inclusions or the like are at least to some extent inevitable, dynamic image enhancement schemes have been devised to integrate the mosaic patterning of fiber ends and non-conducting or partially conducting spaces resulting from fiber breakage or transmission variations between fibers.

The theory of dynamic scanning is explained in the Journal of the Optical Society of America, Vol. 47, No. 5, May, 1957, pages 423–427 and also in the New York Academic Press, 1967.

The ungainliness, complexity and costliness of these earlier applications of dynamic scanning have largely outweighed and/or defeated their advantages. U.S. Pat. No. 3,016,785 is exemplary. Its complex and ungainly mechanism for effecting a break-up motion between opposite ends of a fiber bundle and optical images received and emitted thereby is not utilitarian in fiber optic endoscopes which must not be so distally or otherwise encumbered.

Similarly, U.S. Pat. Nos. 3,217,588 and 3,217,589 synchronously nutate images at the receiving and output ends of fiber optic cables using motor driven geared mechanisms which are bulky and heavy, complex and costly and limited to use in areas other than those of endoscopy where unencumbered instrumentation is required.

In application Ser. No. 853,060 filed on Nov. 21, 1977 there is disclosed an image enhancement system for fiberscopes which overcomes many of the problems and/or drawbacks of the aforesaid older dynamic image enhancement schemes but which is somewhat less than optimally applicable to fiberscopes having severe limitations of equipment space as do the smaller varieties of medical endoscopes, for example.

Although it may be possible to reduce the size of the configuration of the Ser. No. 853,060 apparatus to the very small space permitted in a medical endoscope, i.e. a fiberscope having a short-focus objective lens system, other factors such as width of field of view become limited.

Accordingly, it is a principal object of this invention to provide an improved dynamic image enhancement system which has special applicability and adaptability to the small space requirements of medical endoscopes, but without limitation to such scopes.

Another object is to accomplish the foregoing without encumbrance of the endoscopes and in a simple, highly effective and inexpensive manner.

Other objects and advantages of the invention will become apparent from the following description.

SUMMARY OF THE INVENTION

The aforesaid objects and their corrolaries are accomplished by positioning an alternating current solenoid adjacent distal and proximal ends of the optical fiber bundle of a fiberscope with axes of the solenoids coincident with the optical axis of the bundle. Immediately forwardly of and centered with the distally located solenoid is a short bundle of light-transmitting fibers carried by a transversely magnetized permanent magnet which, in turn, is pivotable about an axis perpendicular to the axis of the sort fiber bundle. Adjacent the opposite proximally located solenoid is a similarly pivotable permanent magnet which carries another short bundle of optical fibers or a suitable image transmitting plate for receiving images transferred by the fiberscope bundle.

With both solenoids operating under identical phase, frequency and amplitude or otherwise arranged to produce identical harmonic oscillation of the permanent magnets, images transferred to the fiberscope bundle by the distally located short bundle of fibers are caused to sweep back and forth across the corresponding distal end of the fiber bundle and consequently similarly across its proximal viewing end. The proximal scanning renders received images static and of improved resolution by reason of their havng been dynamically scanned across the fiberscope bundle prior to reception for viewing.

The sweep directions of scanning are made to correspond at opposite ends of the fiber bundle by rotational adjustment of one end of the bundle relative to the other.

Details of the invention will become more readily apparent from the following description when taken in conjunction with the accompanying drawings, in which:

FIG. 1 is a partially cross-sectioned diagrammatic illustration of a preferred embodiment of the invention; and FIG. 2 is a view taken from the position of line 2—2 in FIG. 1 and looking in the direction of the arrows;

FIG. 3 illustrates a modification of the dynamic image enhancer of FIG. 1; and

Figure 4:
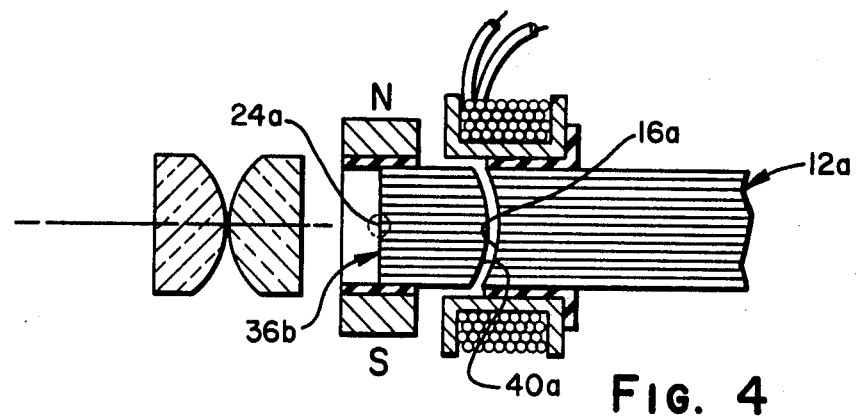

FIGS. 4, 5, 6 and 7 diagrammatically illustrate additional modifications of the invention.

DESCRIPTION OF THE PREFERRED EMBODIMENTS

Fiberscope 10 (FIG. 1) has been shown diagrammatically for ease and clarity of illustration of principles of the invention. The illustrated components are intended to be supported and sheathed in conventional fashion, details of which will not be dealt with herein since they are clearly within the skill of the artisan. Those interested in such details, however, may refer to U.S. Pat. No. 3,913,568. This patent exemplifies a form of fiber optic endoscope to which the present invention is applicable but in no sense restricted.

The basic fiberscope structure of FIG. 1 comprises flexible bundle 12 of light conducting fibers 14 having an image receiving face 16 and image emitting face 18. Faces 16 and 18 each comprise a mosaic of corresponding ends of fibers 14 which are identically geometrically patterned. Images received by face 16 are transmitted through bundle 12 to emitting face 18 by the well known principles of total internal reflection.

In matters of enhancing images transported by fiberscope 10, i.e. suppressing image blemishing resulting from spacings between fibers 14 or fiber breakage or foreign matter inclusions and/or variations of transmission between fibers, dynamic scanning of image receiving and emitting faces 16 and 18 is accomplished as follows:

AC solenoid 20 is fitted coaxially over the distal end of fiber bundle 12 adjacent image receiving face 16 substantially as illustrated. The solenoid is cemented or otherwise fixed in place.

Forwardly of solenoid 20 is permanent magnet 22 which is mounted to pivot about axis 24 (FIG. 2). Axis 24 extends perpendicularly across axis 26 of fiber bundle 12 (FIG. 1). Magnet 22 has a transverse magnetization as illustrated by symbols N and S in FIGS. 1 and 2 and its pivotal support preferably comprises jeweled bearings 28 which receive pivot pins 30. Pins 30 are anchored in the fiberscope's supporting structure 32, a fragmentary portion of which is shown only in FIG. 2. This supporting structure has not been shown in detail and it should be understood that any conventional fiberscope sheathing and/or other supporting means may be used and/or modified with ordinary skill to suit the aforesaid purpose. The structure illustrated in U.S. Pat. No. 3,913,568 is exemplary.

With solenoid 20 de-energized, magnet 22 is held parallel to face 16 of bundle 12 by springs 34. These springs, however, permit a tilting of magnet 22 back and forth relative to fiber bundle face 16 when North and South poles of the magnet are alternately electrically attracted to AC solenoid 20. When the solenoid is energized, magnet 22 is driven in harmonic oscillation about its axis 24 at a frequency corresponding to that of alternating current supplied to leads 21. Other cushioning means such as soft foam rubber pads or their equivalents may be substituted for springs 34. Also, if desired, means such as an annular diaphragm of flexible material may be used to support magnet 22.

Fixedly mounted within magnet 22 is a short bundle 36 of parallel optical fibers 38. Bundle 36 will be referred to hereinafter as scanner 36, its principal function being that of causing optical images to scan across face 16 of fiberscope bundle 12 as will become more readily apparent hereinafter. Fibers 38 are fused together or otherwise held in tight juxtaposition, i.e. in the form of a rigid faceplate.

Face 40 of scanner 36 is positioned against face 16 of flexible bundle 12 with only enough clearance to permit a free rocking action about axis 24 in response to oscillation of the magnet 22. Face 40 is angled to provide edge clearance for the rocking action about axis 24.

Scanner 36, being itself an image conductor which operates on the principles of total internal reflection as does fiber bundle 12, requires only that an image to be transmitted by fiberscope 10 be formed in focus upon its receiving face 42. Such an image will then be transported through scanner 36 and into bundle 12. Thus, a short focus fiberscope objective lens system 44 of conventional design may be used to form images of objects such as arrow 46 upon face 42 of scanner 36. This provision for the use of a short focus objective system, accordingly, renders fiberscope 10 optimally distally compact as is highly desirable and important especially in the field of medical endoscopy.

Oscillation of magnet 22 about axis 24 causes optical images transported by scanner 36 to scan, i.e. sweep, back and forth across face 16 of fiberscope bundle 12. An image motion of as little as 0.1 to 0.3 mm across face 16 of a conventional fiberscope bundle will provide the image enhancement desired. Any loss of image quality due to occurrences of defects in fiber optic scanner 36 can be reduced by using fibers 38 of small diameter, e.g. 5 to 7 microns, it being understood that the relatively short length of scanner 36 itself minimizes any contribution it may make to blemish effects in the fiberscope 10 system.

The length of scanner 36 is determined by the amount of image sweep desired and the angle of swing about axis 24. For example, considering total image sweep of 0.2 mm and a swing of $\pm 3°$, the length of bundle 36 will be approximately 2 mm. With such a small angular swing, little space between the scanner 36 and fiberscope bundle 12, even at the edges of scanner 36, will be required. The angularity of face 40 shown in FIG. 1 and length of scanner 36 are exaggerated for ease and clarity of illustration.

If it is desired to reduce any "out of focus" condition at the edge of the image field, which condition may result from space between scanner 36 and bundle 12, the space may be filled with a liquid (e.g. of refractive index near 1.5) which may also serve as a lubricant.

The system of the invention additionally comprises at the opposite or proximal end of fiberscope 10, a solenoid 20a, magnet 22a, fiber bundle scanner 36a and springs 34a, all of identical structure to corresponding parts 20, 22, 36 and 34 already described. With pivot axes 24 and 24a of magnets 22 and 22a respectively identically oriented by rotating one end of fiber bundle 12 about its axis relative to the other end of fiber bundle 12 as needed, and both solenoids 20 and 20a operating with the same phase and frequency and amplitude, identical sweeps of faces 16 and 18 by scanners 36 and 36a occur and image enhancement results. Scanner 36a renders the image received from face 18 stationary as viewed with eye E through conventional fiberscope eyepiece lenses 48, for example. It should be understood that a camera and/or camera lens system or the like may replace eye E and lenses 48. It should also be understood that in cases where the use of electrical energy at the working or distal end of fiberscope 10 may not be desired, scanner 36 as well as scanner 36a may be oscillated with a tuned reed operated by air or other gas. Synchronously pulsed gas or liquid jets may also be used.

Identical phase and frequency of oscillation of scanners 36 and 36a may be easily conventionally obtained by driving both solenoids 20 and 20a from the same basic AC (e.g. 60 Hertz) power source and matching the amplitudes by adjusting the voltage (or current) supplied to either or both solenoids.

Modification of the proximal or image-receiving end of fiberscope 10 is illustrated in FIG. 3. This replaces the fiber optic scanner 36a with optical plate 50. Image forming light scanning across image emitting face 18 of fiber bundle 12 may be viewed through plate 50, e.g. with eye E and the eyepiece lenses 48 of FIG. 1.

Plate 50 is supported by permanent magnet 52 which is of similar design and function to magnet 22. When operated in synchronism with magnet 22, i.e. to duplicate the frequency and amplitude of image sweep produced by scanner 36, images received at fiberscope 18 are rendered stationary and of improved resolution. Plate 50 may, for example, comprise a high index (1.8) clear glass or higher index (2.4) strontium titanate. Greater details of this modified form of image motion stopping means may be had by reference to the above-mentioned copending application Ser. No. 853,060.

FIGS. 4-7 illustrate other modifications of the primary or distal fiber optic image scanning system (scanner 36) of the invention.

In FIG. 4, scanner 36b pivots about axis 24a which is spaced away from face 16a of fiber bundle 12a. Faces 16a and 40a of fiber bundle 12a and scanner 36b respectively are formed to radii of curvatures centered on axis 24a. Magnet 22a and solenoid 22a afford means for oscillating scanner 36b.

Figure 5:
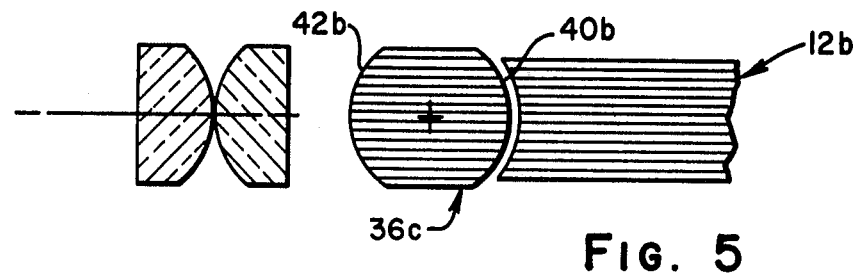
Figure 6:
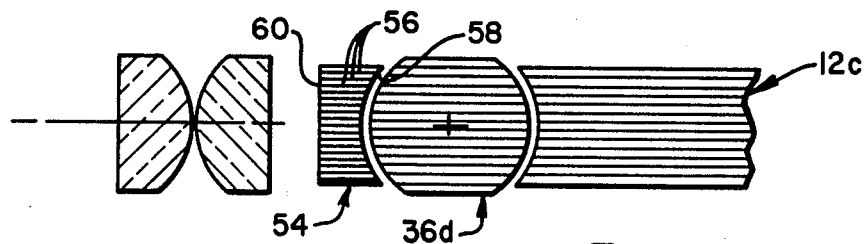
Figure 7:
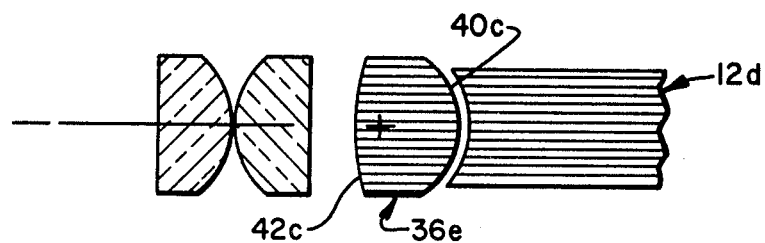

Without further illustration of magnets and solenoids, FIGS. 5, 6 and 7 show scanners 36c, 36d and 36e respectively which have curved image receiving faces. In FIG. 5, scanner 36c has image emitting and receiving faces 40b and 42b of equal radii of curvature. These faces, as in the cases of all others referred to hereinabove, may be either cylindrical or spherical in shape.

In FIG. 6, scanner 36d is preceded by field flattener 54. Flattener 54 comprises a bundle of optical fibers 56 having image emitting face 58 matching the curvature of scanner 36d and a flat image-receiving face 60. Thus, images received at face 60 are, in effect, transferred into fiber bundle 12c without alteration of field curvature and are scanned across bundle 12c by oscillation of scanner 36d.

The construction, purpose and function of fiber optical field flatteners are well known in the art and, accordingly, need no further description herein. Those interested in such details, however, may refer to U.S. Pat. Nos. 2,939,362 and 3,166,395.

In FIG. 7 there is illustrated scanner 36e which is similar to scanner 36c of FIG. 5 but modified by having face 42c of different radius of curvature than its opposite face 40c.

Those skilled in the art will readily appreciate that there are various other forms and adaptations of the invention which may be made to suit particular requirements and, accordingly, the foregoing illustrations are not to be interpreted as restrictive of the invention beyond that necessitated by the following claims.

I claim:

1. A dynamic image enhancement system for a first bundle of optical fibers having image receiving and emitting opposite end faces and means for scanning images to be transmitted by said first bundle across its image receiving face wherein the improvement comprises:

said scanning means including a second image transmitting bundle of tightly juxtapositioned optical fibers having image receiving and image emitting opposite faces, said receiving and emitting faces of respective first and second bundles adjoining each other with allowance for relative movement therebetween;

field flattening means preceding said second image transmitting bundle; and means for oscillating said second bundle relative to said first bundle about an axis extending transversely substantially centrally therethrough for effecting a scanning of images transmitted by said second bundle across said receiving face of said first bundle and said allowance for relative movement between said image emitting face of said second bundle and image receiving face of said first bundle being effected by rendering said last mentioned faces approximately equally radially curved.

2. A dynamic image enhancement system according to claim 1 wherein said field flattening means includes a third bundle of tightly juxtapositioned optical fibers, said third bundle having an image emitting face curved to substantially match the curvature of said image receiving face of said second bundle and disposed in aligned adjoining relationship with said image receiving face of said second bundle.

3. A dynamic image enhancement system for a first bundle of optical fibers having image receiving and emitting opposite end faces and means for scanning images to be transmitted by said first bundle across its image receiving face wherein the improvement comprises said scanning means including a second image transmitting bundle of tightly juxtapositioned optical fibers having image receiving and image emitting opposite faces, said receiving and emitting faces of respective first and second bundles adjoining each other with allowance for relative movement therebetween;

means for oscillating said second bundle relative to said first bundle for effecting a scanning of images transmitted by said second bundle across said receiving face of said first bundle, said means for oscillating said second bundle relative to said first bundle including an alternating current solenoid encircling said first bundle adjacent said image receiving face thereof and a transversely magnetized permanent magnet on said second bundle.

* * * * *